(12) United States Patent
Johnson et al.

(10) Patent No.: US 8,097,050 B2
(45) Date of Patent: Jan. 17, 2012

(54) ROTARY VACUUM APPARATUS FOR AIR SCREEN

(75) Inventors: Brian K. Johnson, Rock Island, IL (US); Panos Tamamidis, Mt. Prospect, IL (US); David A. Scott, Bettendorf, IA (US)

(73) Assignee: CNH America LLC, New Holland, PA (US)

( * ) Notice: Subject to any disclaimer, the term of this patent is extended or adjusted under 35 U.S.C. 154(b) by 287 days.

(21) Appl. No.: 12/339,906

(22) Filed: Dec. 19, 2008

(65) Prior Publication Data

US 2009/0211208 A1 Aug. 27, 2009

Related U.S. Application Data

(60) Provisional application No. 61/031,618, filed on Feb. 26, 2008.

(51) Int. Cl.
*B01D 50/00* (2006.01)
(52) U.S. Cl. ............. 55/289; 55/294; 55/295; 55/385.3; 460/98; 460/102
(58) Field of Classification Search ............ 55/268, 55/272, 288, 294, 299, 385, 296, 297, 385.3; 460/97, 98, 99, 100, 101, 102; 15/352
See application file for complete search history.

(56) References Cited

U.S. PATENT DOCUMENTS

| | | | |
|---|---|---|---|
| 1,498,061 A | 6/1924 | Adams | |
| 2,636,612 A | 4/1953 | Cording et al. | |
| 2,716,494 A | 8/1955 | Hursh | |
| 3,183,647 A | 5/1964 | Lang | |
| 3,377,780 A | 4/1968 | Noland | |
| 3,755,992 A | 9/1973 | Ylinen | |
| 3,887,344 A * | 6/1975 | Smith | 55/294 |
| 4,057,105 A | 11/1977 | Bailey | |
| 4,099,942 A | 7/1978 | Carnewal et al. | |
| 4,233,040 A * | 11/1980 | Vogelaar et al. | 55/282.5 |
| 4,364,755 A * | 12/1982 | Ferri | 55/290 |
| 4,439,218 A * | 3/1984 | Priepke et al. | 55/288 |
| 4,542,785 A * | 9/1985 | Bagnall et al. | 165/95 |
| 4,700,492 A * | 10/1987 | Werner et al. | 34/403 |
| 4,725,292 A | 2/1988 | Williams | |
| 5,114,444 A * | 5/1992 | Stuble | 55/294 |
| 5,217,512 A | 6/1993 | Williams | |
| 5,238,502 A | 8/1993 | Jenkins | |
| 5,466,189 A * | 11/1995 | Deutsch et al. | 460/100 |
| 5,466,271 A * | 11/1995 | Horvat | 55/294 |
| 5,651,802 A * | 7/1997 | Carter et al. | 55/294 |
| 5,735,337 A | 4/1998 | Edwards | |
| 5,781,962 A | 7/1998 | Fiegel et al. | 15/392 |
| 7,186,281 B2 * | 3/2007 | Cheng | 55/289 |

* cited by examiner

*Primary Examiner* — Duane Smith
*Assistant Examiner* — Thomas McKenzie
(74) *Attorney, Agent, or Firm* — Michael G. Harms (57) ABSTRACT

A vacuum apparatus rotatable about an axis through a filter screen for continually removing contaminants, which utilizes an asymmetrical vacuum arm supported by a center hub, and large longitudinally extending asymmetrical vacuum orifices in portions of the arm on opposite sides of the hub, operable for removing large elements of debris, trash and the like from the screen. One of the arm portions cleans a radial outer region of the screen, and the other cleans an inner region, the arm portions being generally even in mass for balance. A knife disposed on the screen cleans and cooperates with a brush on the arm for breaking up larger elements of trash. The arm is also manually removable via a snap together vacuum seal joint, for service and cleaning.

28 Claims, 8 Drawing Sheets

ROTARY VACUUM APPARATUS FOR AIR SCREEN

This application claims the benefit of U.S. Provisional Application No. 61/031,618, filed Feb. 26, 2008.

TECHNICAL FIELD

The present invention generally relates to a rotary vacuum apparatus for an air screen for filtering air flow to heat dissipating devices used for cooling functional elements of work machines such as harvesters for cotton, grains, and corn, construction machines, forestry machines, mining machines, and the like, and, more particularly, to a modular rotary vacuum apparatus having an improved capability for handling larger elements of trash, with less screen wear, and other advantages, including ease of disassembly and cleaning.

BACKGROUND ART

U.S. Provisional Application No. 61/031,618, filed Feb. 26, 2008, is incorporated herein in its entirety by reference.

Modern work machines, particularly agricultural harvesters for plants such as cotton, grains, and corn, are typically operated under hot, dry environmental conditions wherein considerable levels of dust, chaff, and straw and/or lint, and other trash and potential contaminants and debris, are raised and are airborne in the vicinity of the machine. These machines include various functional elements, including, but not limited to, internal combustion engines and hydraulic systems, which are cooled by heat dissipating devices such as heat exchangers or radiators. Certain levels of air flow must be directed through the heat dissipation devices during various periods, to effect proper removal of heat therefrom, and to avoid overheating and premature breakdown and failure of the functional elements and the cooling systems. Often, the air flow requirements are greatest while the levels of airborne contaminants are high, creating an increased potential for the deposition and buildup of the contaminants in small interstices and passages in screens and grills covering and protecting the heat dissipating devices, and in the devices themselves, which can reduce the cooling efficiency thereof so as to require periodically stopping the operation of the machine and cleaning the heat dissipating devices and/or screens or grills.

Rotary air filters and screens having apparatus providing at least some self-cleaning capability so as to avoid manual cleaning requirements associated with the known fixed grills and screens, are known. Reference in this regard, Carnewal et al. U.S. Pat. No. 4,099,942 issued Jul. 11, 1978 to Sperry Rand Corporation, which discloses a rotary air filter utilizing a hollow perforated rotary structure having a generally unobstructed lengthwise inner surface, and a discharge opening in line therewith through which foreign material which enters the structure through the perforations can be discharged. It is also disclosed that the filter can include a brush positioned within the structure for brushing the inner perforated surface thereof when rotated. An observed shortcoming of rotary air filters of this type, however, is the requirement of relatively large perforations in the structure which can allow relatively large amounts of foreign material into the interior thereof, some of which foreign material can pass beyond the discharge structure and collect on the radiators, engine, and other functional elements to an undesirable extent. Another observed shortcoming with this and other rotary screens is wear at the seal interface between the rotating air filter and the surrounding fixed structure, which can create openings through which contaminants can pass.

Still other devices are known which scrape or plow material from rotary filters, as evidenced in Hursh U.S. Pat. No. 2,716,494 issued Aug. 30, 1955 to Lukens Steel company, and Cording et al. U.S. Pat. No. 2,636,612 issued Apr. 28, 1953 to the United States of America. However, the known scraper and plow devices are necessarily of rigid construction such that, if biased or urged against a filter screen to an effective extent, would likely stretch and deform the screen over time thus lessening the cleaning effect achieved. Also, such devices, if allowed to prolongedly contact a mesh screen or the like, can rub or wear through the screen, thus necessitating replacing or repairing the screen on a more frequent than desirable basis. Further, if the leading edge of the scraper or plow wears, it can form an edge that can tear and damage the filter screen. Some of the disclosed scrapers and plows also have relatively complex geometric shapes, making them costly to make.

Still further devices utilize vacuum arms rotatable over a screen for removing contaminants, however, many of these devices utilize small vacuum orifices that would likely become clogged with larger elements of trash and debris, such as corn leaves and the like, and some are asymmetrical such that vacuum is provided to only one arm, requiring an opposite counterbalance weight, which is otherwise useless.

Thus, what is sought is a cleaning apparatus for an air filter screen for agricultural machines which more effectively filters air flow therethrough, without the shortcomings and disadvantages set forth above.

SUMMARY OF THE INVENTION

What is disclosed is a rotary vacuum cleaning apparatus for an air filter screen for agricultural and other machines which more effectively filters air flow therethrough, without the shortcomings and disadvantages set forth above.

According to a preferred aspect of the invention, the apparatus includes a vacuum arm, preferably of asymmetrical construction, having a center hub mounted for rotation in close proximity to the air filter screen, about a rotational axis extending through the screen. The vacuum arm includes an elongate hollow first arm portion extending radially outwardly from the hub, and an elongate hollow second arm portion extending radially outwardly from the hub oppositely of the first arm portion. The first arm portion includes an elongate first vacuum orifice which faces the air filter screen and has a first radial extent extending radially outwardly to a radial outer end thereof. The second arm portion includes an elongate second vacuum orifice which faces the air filter screen and has a second radial extent extending from a radial inner end thereof to a radial outer end thereof. The radial outer end of the first vacuum orifice and the radial inner end of the second vacuum orifice are preferably located at about an equal radial distance from the rotational axis, and the vacuum arm portions are configured to be substantially equal in mass so as to be substantially balanced about the rotational axis.

According to another preferred aspect of the convention, the center hub of the vacuum arm is connected by a snap together rotary joint to a duct extending to a vacuum source. The rotary joint is preferably configured such that the center hub and the duct will be brought together to create a substantially sealed condition therebetween by the partial vacuum condition when present. Also preferably, the sealed condition will be broken when the partial vacuum condition is absent to allow manually disassembling or snapping the joint apart for removing the arm.

As another preferred aspect of the invention, the apparatus includes an elongate plate supported for rotation about the rotational axis with the vacuum arm, in at least substantially parallel opposing relation thereto in proximity to an opposite surface of the air filter screen from the vacuum arm, for increasing effectiveness of vacuum conditions present in the orifices for removing contaminants from the screen.

According to still another preferred aspect of the invention, at least one of the arm portions includes at least one brush extending longitudinally therealong, for improving contaminant removal, by limiting vacuum loss and dissipation, and for operation in cooperation with a knife disposed on the screen and configured for cleaning debris and larger elements of contamination, such as leaves of plants and the like, from the brush. Further in this regard, the knife can include serrations or fingers for breaking up the larger elements for facilitating induction into the vacuum arm. Preferably, the brush is supported so as to move in close proximity to the screen surface, without actually contacting the surface, and the serrations or fingers, are oriented so as to extend in the direction of rotation of the brush, so as to be non-aggressive, for achieving good cleaning of the brush and break up of larger contaminants, without excessive wear and other problems.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
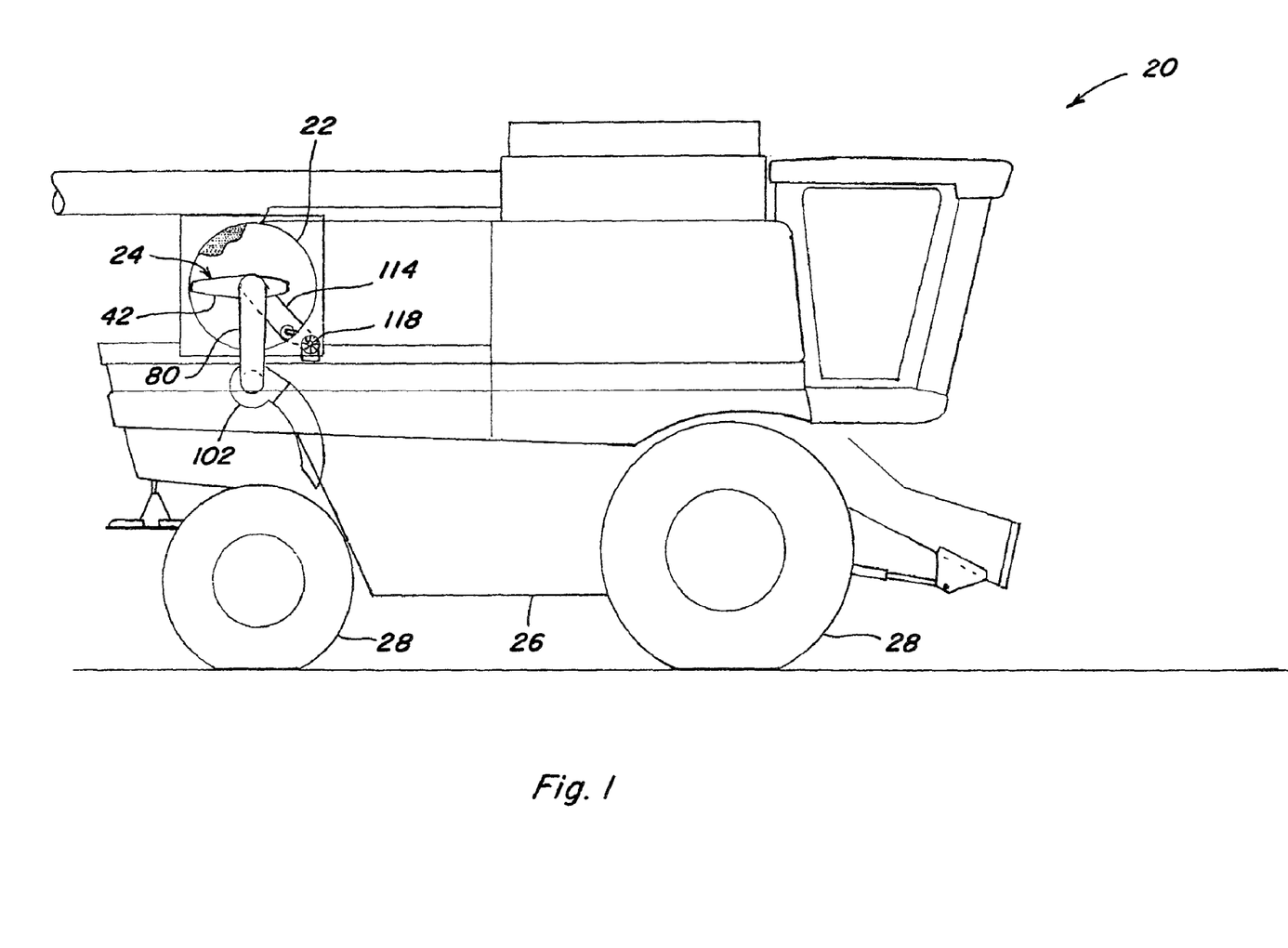
FIG. 1 is a simplified fragmentary side view of a harvester including a rotary vacuum cleaning apparatus according to the present invention.

Referring now to the drawings, in FIG. 1, a representative work machine, which is an agricultural combine harvester 20, is shown including an air filter screen assembly 22, and an associated rotary vacuum cleaning apparatus 24 constructed and operable according to the teachings of the present invention, for cleaning screen assembly 22. Harvester 20 includes a mobile frame 26 supported by a plurality of wheels 28 for movement over the ground for harvesting crops from a field using a header (not shown) mounted to the front of harvester 20, in the well-known manner. Harvester 20 includes an internal combustion engine (also not shown) for providing motive power to wheels 28, and a hydraulic circuit including a pump (not shown) driven by the engine, for propulsion, and also powering various subsystems of harvester 20, again, in the well-known manner. Harvester 20 includes at least one heat exchanger and/or radiator for dissipating heat from elements of various of the subsystems of harvester 20, via hydraulic fluid, coolant, and air conditioning refrigerant fluid, circulated through the various subsystems and the engine itself, respectively. This heat is removed by an airflow directed through the various heat exchangers and/or radiators, which airflow is first inducted through air filter screen assembly 22 so as to be cleaned of contaminants, such as dust particles, and elements and fragments of crops, such as leaves and the like.

Figure 2:
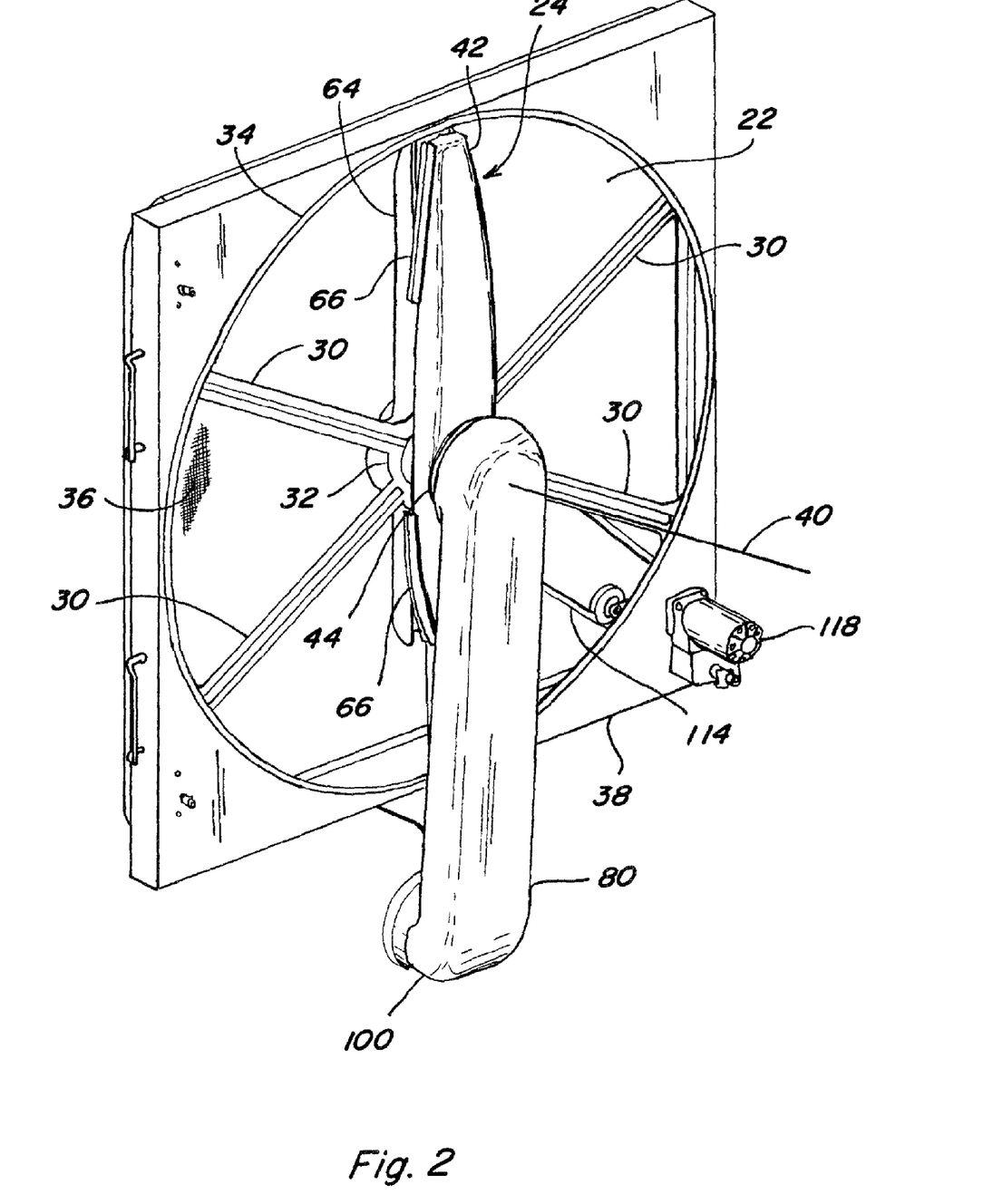
FIG. 2 is a simplified perspective view of the rotary vacuum cleaning apparatus of FIG. 1, in association with an air filter screen.
Figure 3:
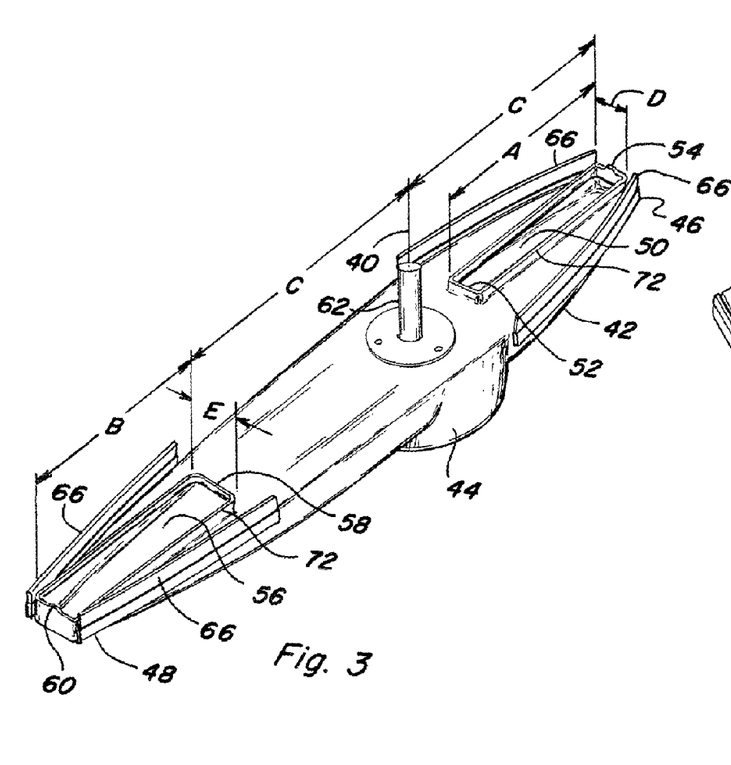
FIG. 3 is an enlarged perspective view of a vacuum arm of the apparatus, showing various features thereof.
Figure 4:
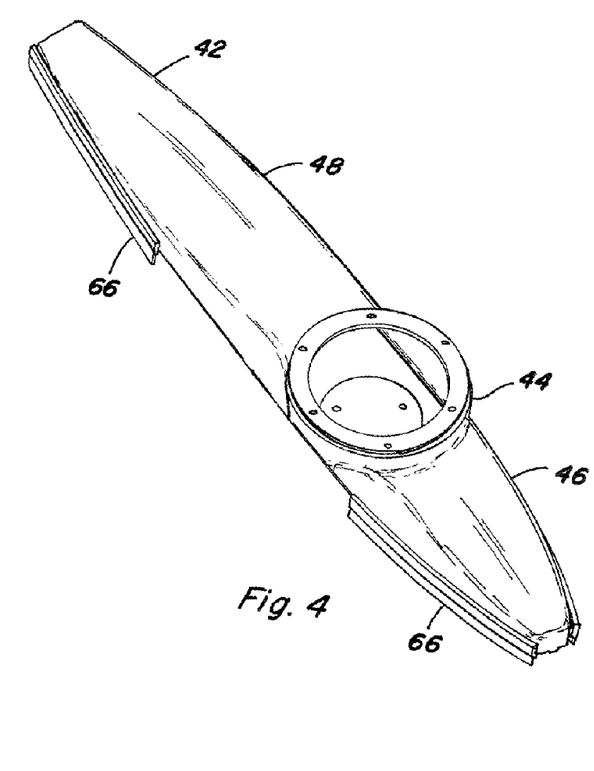
FIG. 4 is another enlarged perspective view of the vacuum arm.
Figure 5:
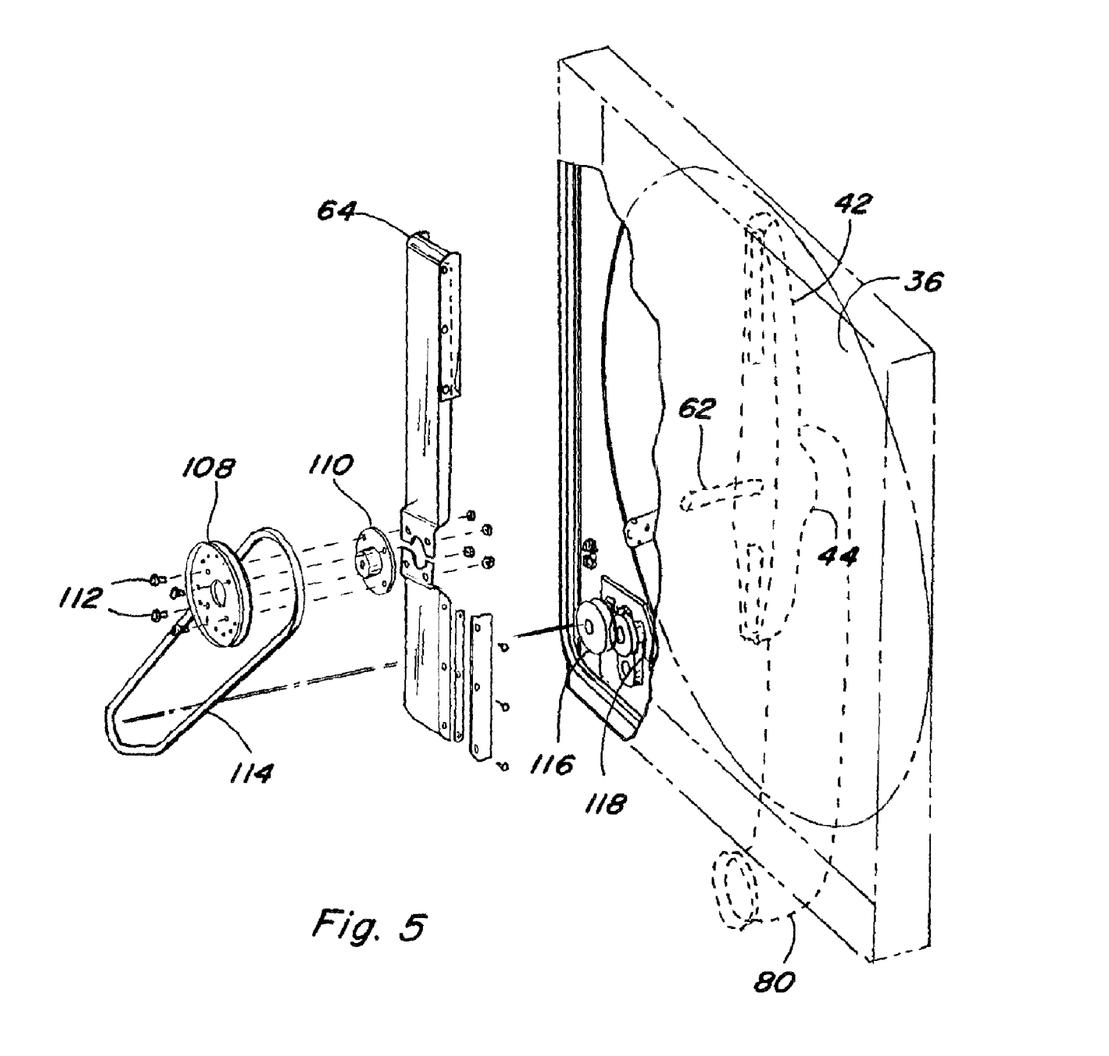
FIG. 5 is an exploded perspective view, showing aspects of the apparatus.
Figure 6:
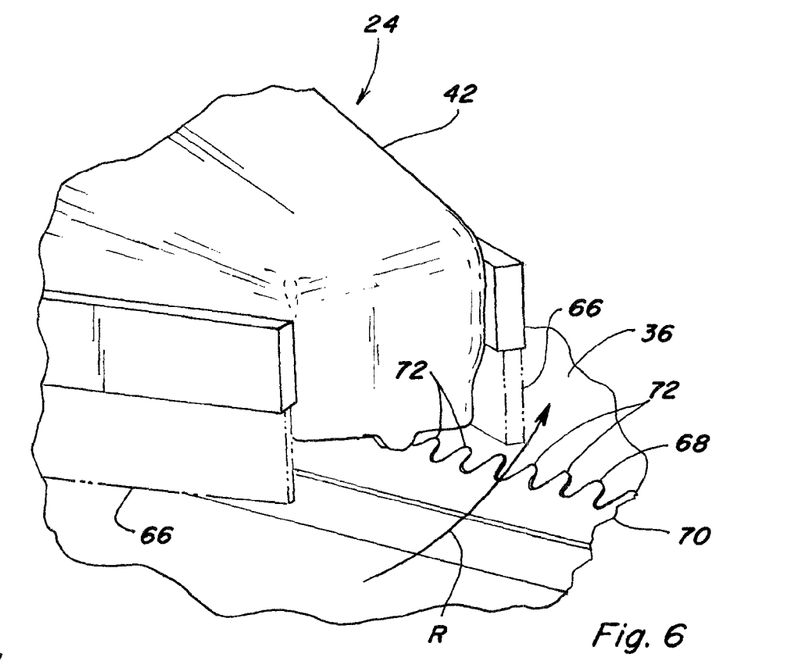
FIG. 6 is a fragmentary perspective view of the apparatus, illustrating interaction between a knife on the air filter screen and brushes on the vacuum arm.
Figure 7:
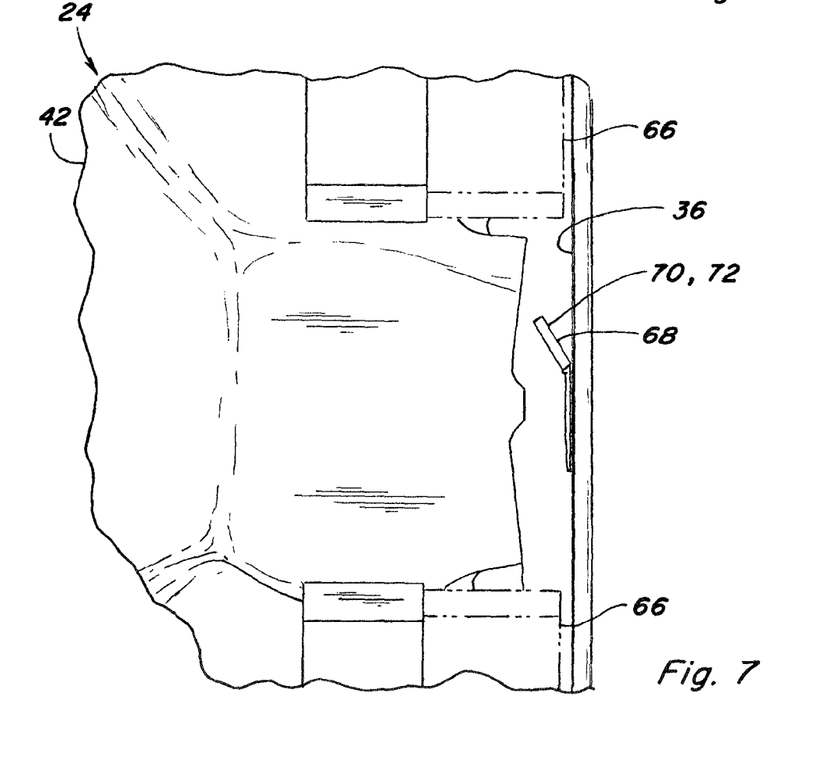
FIG. 7 is another fragmentary rear perspective view of the knife and brushes on the vacuum arm.

Referring also to FIG. 2, air filter screen assembly 22 includes a plurality of radial ribs 30 extending radially outwardly from a center hub 32 at angularly spaced locations therearound to an outer circumferential rim 34, hub 32, radial ribs 30, and rim 34 forming a structure supporting an axially facing, generally circular perforated screen 36, through which the airflow is inducted into harvester 20. Ribs 30 and circumferential rim 34 are illustrated here as being supported by a rectangular frame 38 of sheet metal construction. However, it should be recognized and understood that a wide variety of alternative constructions could be utilized with apparatus 24 of the invention.

Screen 36 is of conventional, well-known construction, and includes a large number of interstices, perforations or other openings for the passage of air therethrough, the size of the openings being selected so as to filter out airborne material and contaminants that are desired to be prevented from entering harvester 20.

Referring to FIGS. 3, 4, 5, 6, 7, 8, 9, 10, 11 and 12, to remove the materials and contaminants from screen 36, rotary vacuum cleaning apparatus 24 of the invention includes an asymmetrical vacuum arm 42 supported for rotation about a central axis 40 through screen assembly 22 in at least substantially parallel proximity to screen 36 thereof. Vacuum arm 42 includes a center hub 44 which supports it, an elongate first arm portion 46, and an opposite elongate second arm portion 48, both arm portions extending radially from hub 44. Hub 44 and first and second arm portions 46 and 48 are preferably hollow, rigid structures, and the arm portions are preferably asymmetrical lengthwise. In particular, first arm portion 46 preferably extends a first distance radially outwardly from hub 44, and second arm portion 48 extends a second distance radially outwardly from hub 44 oppositely of first arm portion, the second distance being greater than the first distance. First arm portion 46 includes an elongate, radially extending first vacuum orifice 50 oriented to face screen 36, and having a first radial extent, denoted A in FIG. 3, extending radially outwardly from a radial inner end 52 thereof, to a radial outer end 54 thereof. Second arm portion 48 includes an elongate, radial extending second vacuum orifice 56 oriented also to face screen 36, and having a second radial extent, denoted B, extending from a radial inner end 58 thereof to a radial outer end 60 thereof, radial outer end 54 of first vacuum orifice 50 and radial inner end 58 of second vacuum orifice 56 being located at about an equal radial distance, denoted C, from rotational axis 40. First vacuum orifice 50 additionally has a lateral extent, denoted D, and second vacuum orifice 56 has a lateral extent, denoted E, extent E being greater tan extent D. desirably, orifices 50 and 56 are spaced axially from screen 36, to allow free movement of arm 42 thereover, but while still providing sufficient vacuum or negative pressure for cleaning contaminants from screen 36.

Center hub 44 includes a short shaft 62 aligned with rotational axis 44, which shaft 62 extends through center hub 32 of screen assembly 22 for supporting arm 42. Apparatus 24 includes an elongate plate 64 supported on shaft 62 for rotation about rotational axis 40 with arm 42, in at least substantially parallel opposing relation thereto in proximity to an opposite surface of screen 36 from arm 42, for limiting vacuum loss through screen 36 for improving cleaning. The opposite side of hub 44 serves as a vacuum inlet, and connection to a vacuum source, discussed below.

Arm 42, and preferably plate 64 also, include brushes 66 extending longitudinally therealong beside side edges of vacuum orifices 50 and 56. Brushes 66 preferably are sufficiently long so as to be in close proximity with screen 36, for several purposes, including for brushing larger elements of contaminants, such as leaves and crop fragments, along screen 36 in advance of the vacuum orifices, and reducing vacuum loss laterally from the vacuum orifices, but brushes 66 preferably do not contact screen 36, to reduce wear and thus increase the life of both the brushes and screen.

Apparatus 24 traditionally includes at least one elongate knife 68 on the surface of screen 36 facing vacuum arm 42, and extending radially outwardly generally from center hub 32 of screen assembly 22, to circumferential rim 34. Knife 68 has an elongate edge portion 70, which extends upwardly from screen 36 into the path of brushes 66, such that brushes 66 contact edge portion 70 as they pass knife 68. Preferably, edge portion 70 is oriented to face in the direction of rotation of arm 42, as denoted by arrow R in FIG. 6, at an acute angle to screen 36. Still further, edge portion 70 preferably includes serrations or radially spaced apart fingers 72, over which and between which filaments of brushes 66 move, for cleaning brushes 66, and also breaking up and fragmenting the larger elements of contaminants, such as leaves and the like. Here, it should be noted that the leading edges of arm 42 are raked back in the direction of rotation, so as to be operable for radially outwardly shedding crop material and other contaminants that may build up therealong, and along brushes 66. Here also, it should be noted that each of vacuum orifices 50 and 56 is at least partially surrounded by an axially extending lip 72, which serves to maintain vacuum in proximity to screen 36 for improved cleaning effect.

Figure 8:
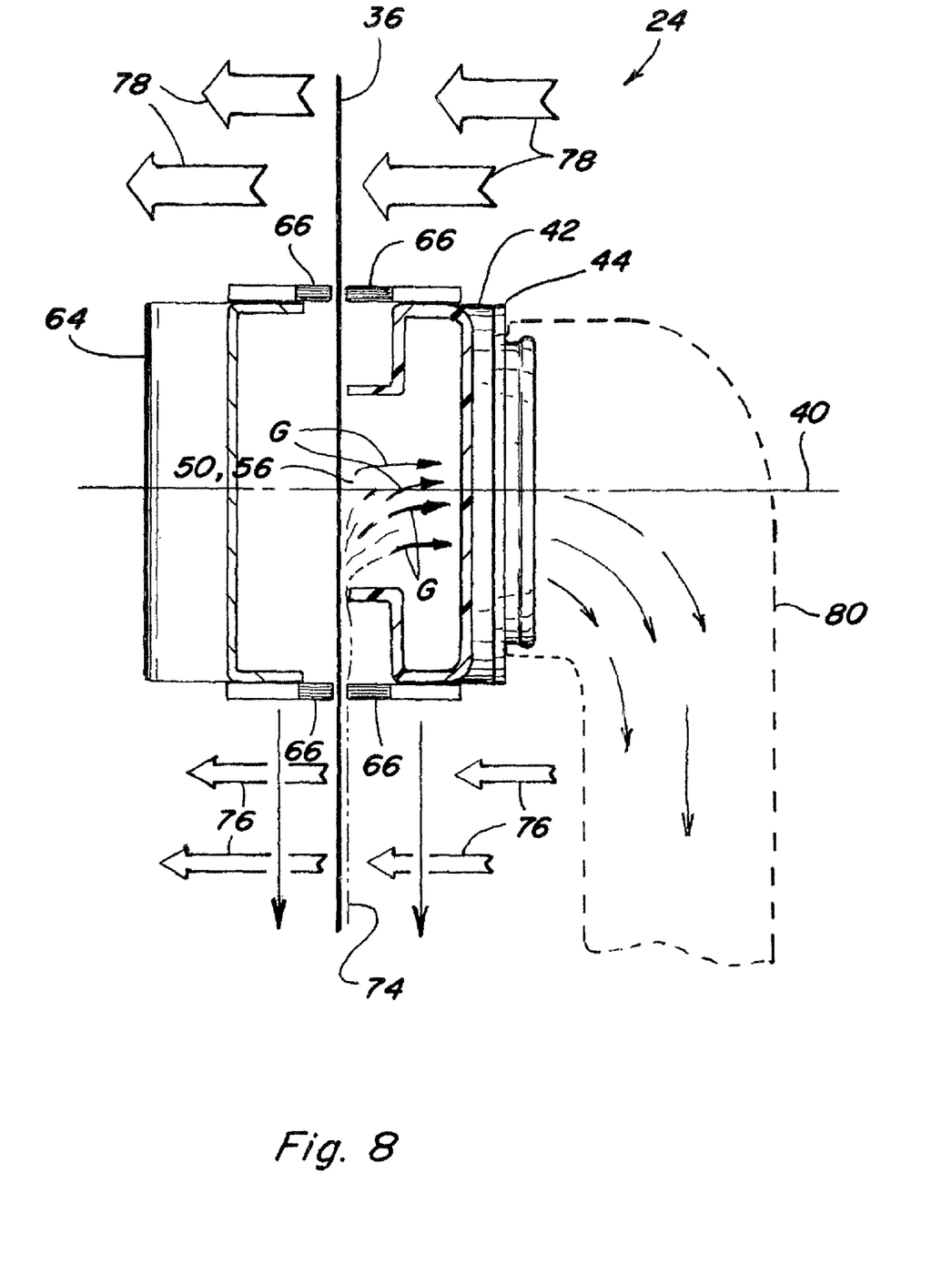
FIG. 8 is a partial sectional view of the apparatus, illustrating airflow through the air filter screen, and vacuum and contaminant flow in the apparatus.

In FIG. 8, a film or build up of contaminants 74 is illustrated on the surface of screen 36, and being lifted and removed therefrom, as denoted by arrows G, by the vacuum condition that is created within orifices 50 and 56 according to the invention. Decreased air flow through screen 36 before cleaning, is denoted by small arrows 76, relative to increased airflow after cleaning by apparatus 24, denoted by larger arrows 78, to illustrate the capabilities achievable using the present invention.

Figure 9:
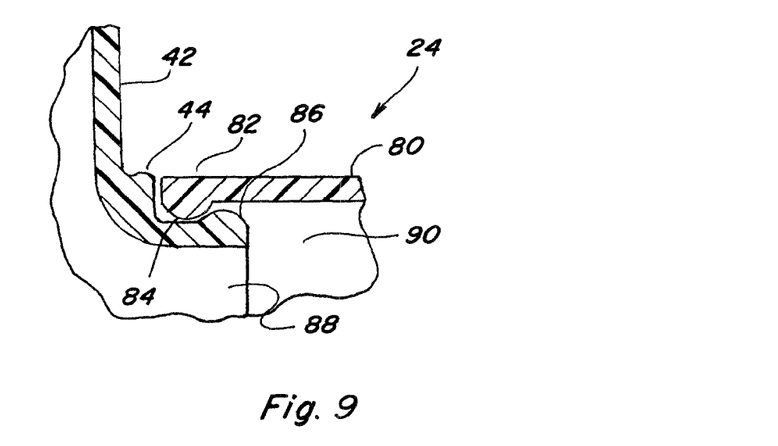
FIG. 9 is a fragmentary sectional view illustrating one embodiment of a snap together rotary joint of the invention in the absence of a vacuum condition.
Figure 10:
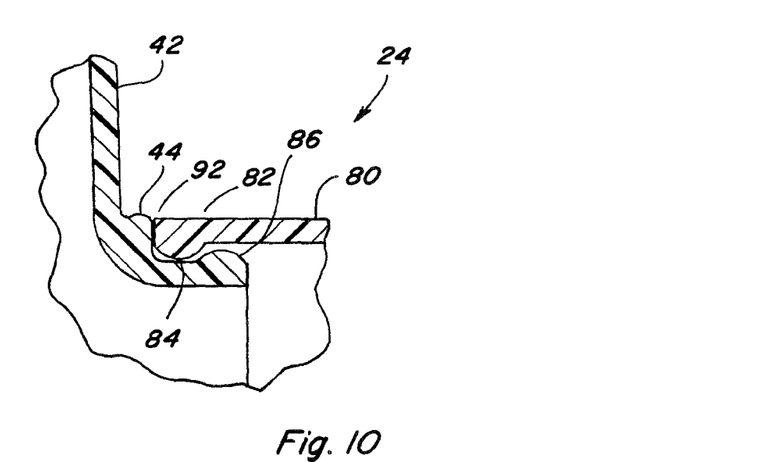
FIG. 10 is another fragmentary sectional view of the joint with a vacuum condition present.

A partial vacuum condition is delivered to arm 42 by a duct 80, which is preferably connected to center hub 44 by a rotary joint which forms a sealed condition therebetween, which is preferably a snap together rotary joint 82. A snap together joint is preferable and desirable, as it allows quick and easy disassembly and reassembly for purposes including maintenance, cleaning, and inspection. Here, joint 82 is advantageous as it includes annular, interlocking beads 84 and 86 extending around a vacuum inlet 88 of center hub 44, and an open end 90 of duct 80, respectively, which are configured to be capable of being manually snapped together and snapped apart relatively easily. When snapped together in a partial vacuum condition is present in inlet 88 and open end 90, the vacuum condition will act to pull duct 80 toward hub 44, to form a substantially sealed condition at a rotary interface 92 therebetween, at which relative rotation of hub 44 and duct 80 will occur, as illustrated in FIG. 10. Here, it should be noted that vacuum arm 42 and hub 44 thereof, as well as duct 80, will preferably be constructed of a rigid and durable plastics material, including the beads of joint 82 integrally formed therein, which is suitable for maintaining the desired sealed condition without excessive wear. Additionally, when the vacuum condition is not present, joint 82 will preferably be relatively loose, providing a working clearance or float, as illustrated in FIG. 9, to facilitate the snap together assembly and disassembly of the joint.

Figure 11:
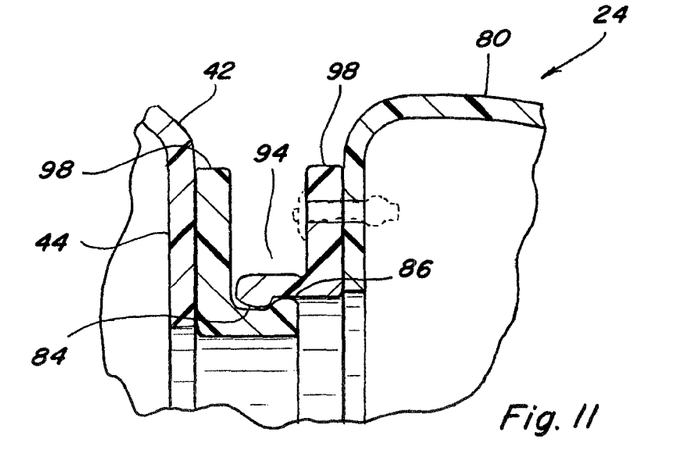
FIG. 11 is a fragmentary sectional view illustrating another embodiment of a snap together rotary joint of the invention.

In FIG. 11, an alternative snap together rotary joint 94 is illustrated, which includes annular members including beads 84 and 86, which are separately mountable to hub 44 and duct 80, to allow separate replacement of joint 94 as result of wear or damage, or the like. Here, is contemplated that the components of joint 94 would be manufactured from a suitable different plastics material form the composition of the other components, for instance, but not limited to, a nylon material. In both instances, it should be noted that it is contemplated that vacuum arm 42 will be relatively slow-moving, such that heat generation, wear and vacuum leakage, can be minimized. Here, it is contemplated that arm 42 and duct 80 will be produced using a suitable manufacturing process, such as blow molding, or roto-molding, using a material such as a polyethylene or polypropylene, and is contemplated that opposing nylon rings would provide good sealing and wear characteristics, compared to the other materials.

As an advantage of the invention, it is been found that the asymmetrical vacuum orifice configuration provides a continuous sweep across the entire diameter of the air filter screen, while maintaining relatively high suction characteristics across the sweep path. In this regard, computational fluid dynamics analysis found that a split asymmetrical orifice configuration produced significantly higher and uniform average suction pressure and velocity across the entire orifice area compared to either a full-length, two-sided, or single-sided nozzle. The differential between lateral widths of the nozzles is advantageous as it evenly balances air flow distribution between the orifices. In this regard, it has been found that orifices which are too narrow can prevent larger trash, e.g., corn leaves, from entering the orifice, leading to build up and blockage of the system. The breakup of larger trash by the cooperative action of the brushes and knife aid in this regard. The ability to construct the apparatus of the invention largely from plastics material is desirable for weight reduction and cost savings.

Figure 12:
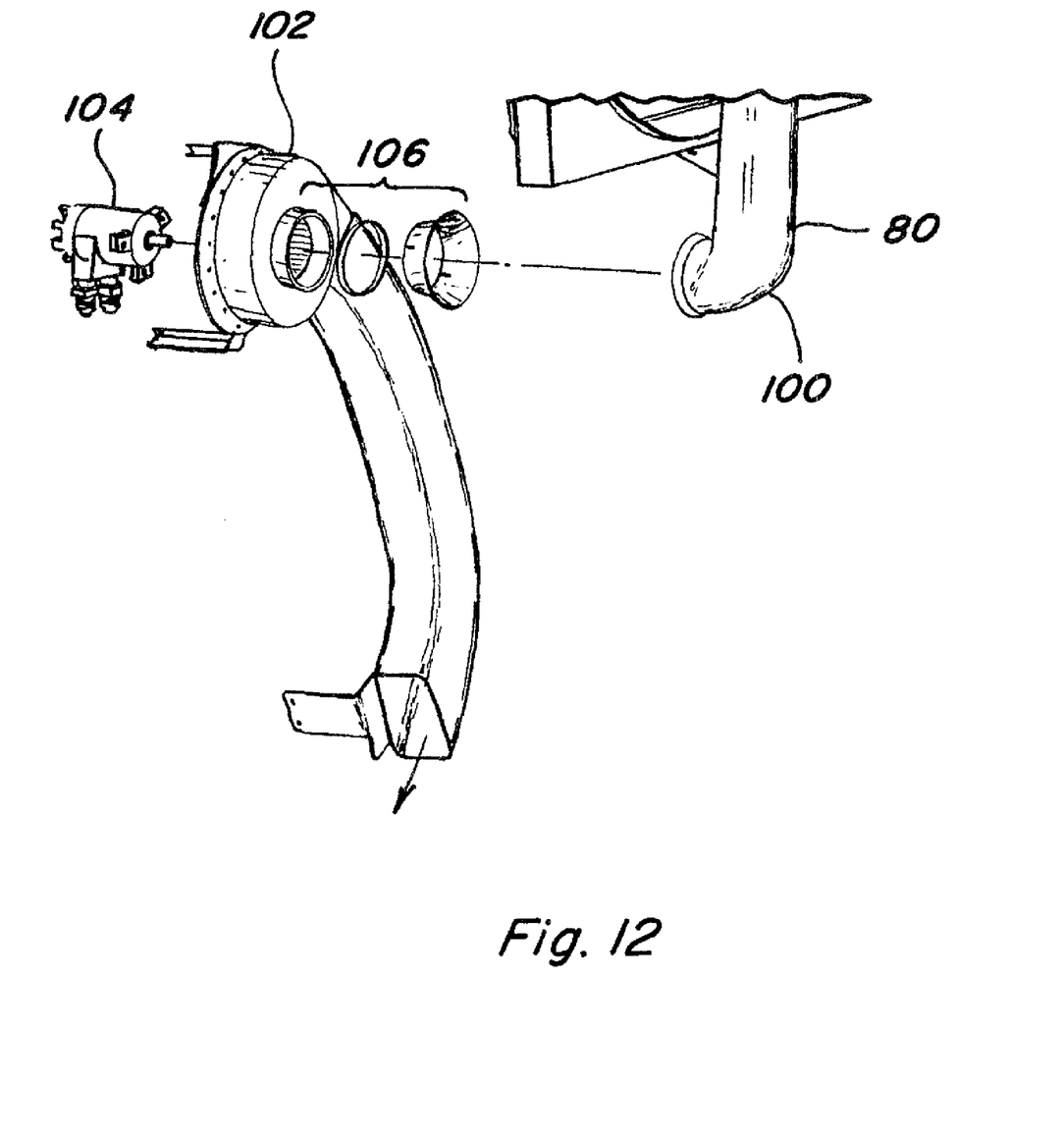
FIG. 12 is an exploded view of additional aspects of the invention, including duct work and elements of a vacuum source for providing vacuum to the vacuum arm.

An opposite end 100 of duct 80 will be connected to a suitable vacuum source, which in FIG. 12, is illustrated to be a fan 102, such as a squirrel cage or centrifugal type fan, as commonly utilized for generating vacuum conditions in apparatus such as the present invention. Fan 102 can be suitably powered, such as utilizing a motor such as an electric or fluid motor 104. Connection of end 100 of duct 80 to fan 102 can be achieved utilizing suitable sealed connections, as illustrated by connection 106, in the well-known manner.

Vacuum arm 42 and plate 64 are supported on shaft 62 which extends through center hub 32 of screen assembly 22, which, in turn, connects to a sheave 108, with a flange 110, assembled together by fasteners 112. A belt 114 partially encircles sheave 108, and a drive sheave 116 on a suitable propulsion device, which can be, for instance, a second motor, such as an electric or fluid motor 118 mounted to a corner of frame 38 of screen assembly 22.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A vacuum apparatus rotatable about a rotational axis, for removing contamination from an air filter screen, comprising:
    an asymmetrical vacuum arm having a center hub for supporting the arm for rotation about the rotational axis in at least substantially parallel proximity to the air filter screen,
    the vacuum arm including an elongate hollow first arm portion extending a first distance radially outwardly from the hub, and an elongate hollow second arm portion extending a second distance radially outwardly from the hub, wherein the first and second arm portions extend in opposite directions, further wherein the second distance is greater than the first distance, the first arm portion including an elongate first vacuum orifice oriented to face the air filter screen and having a first radial extent extending radially outwardly to a radial outer end thereof, the second arm portion including an elongate second vacuum orifice oriented to face the air filter screen and having a second radial extent extending from a radial inner end thereof to a radial outer end thereof, the radial outer end of the first vacuum orifice and the radial inner end of the second vacuum orifice being located at about an equal radial distance from the rotational axis.

2. Apparatus of claim 1, further comprising an elongate plate supported for rotation about the rotational axis with the vacuum arm, in at least substantially parallel opposing relation thereto in proximity to an opposite surface of the air filter screen from the vacuum arm.

3. Apparatus of claim 1, further comprising at least one brush extending longitudinally along at least one of the arm portions.

4. Apparatus of claim 3, wherein the brush is spaced from the air filter screen.

5. Apparatus of claim 3, wherein air filter screen includes a generally radially extending knife on a surface thereof facing the brush and cooperatively engageable therewith when the brush passes thereover, to remove contaminants from the brush.

6. Apparatus of claim 5, wherein the knife includes serrations facing in a direction of rotation of the vacuum arm.

7. Apparatus of claim 1, wherein the center hub of the vacuum arm is connected to a vacuum source for creating a partial vacuum condition in the vacuum orifices.

8. Apparatus of claim 7, wherein the center hub of the vacuum arm is connected by a snap together rotary joint to a duct extending to the vacuum source, such that the joint can be unsnapped to allow removal of the vacuum arm from the duct.

9. Apparatus of claim 8, wherein the rotary joint is configured such that the center hub and the duct will be brought together to create a substantially sealed condition therebetween by the partial vacuum condition when present, and wherein the sealed condition will be broken when the partial vacuum condition is absent.

10. A rotary vacuum apparatus for removing contamination from an air filter screen, comprising:
    an asymmetrical vacuum arm having a center hub mounted for rotation in close proximity to the air filter screen, about a rotational axis extending through the screen,
    the vacuum arm including an elongate hollow first arm portion extending a first distance radially outwardly from the hub, and an elongate hollow second arm portion extending a second distance radially outwardly from the hub, wherein the first and second arm portions extend in opposite directions, further wherein the second distance is greater than the first distance, the first arm portion including an elongate first vacuum orifice which faces the air filter screen and has a first radial extent extending radially outwardly to a radial outer end thereof, the second arm portion including an elongate second vacuum orifice which faces the air filter screen and has a second radial extent extending from a radial inner end thereof to a radial outer end thereof, the radial outer end of the first vacuum orifice and the radial inner end of the second vacuum orifice being located at about an equal radial distance from the rotational axis, and the vacuum arm portions being substantially equal in mass so as to be substantially balanced about the hub.

11. Apparatus of claim 10, further comprising an elongate plate supported for rotation about the rotational axis with the vacuum arm, in at least substantially parallel opposing relation thereto in proximity to an opposite surface of the air filter screen from the vacuum arm.

12. Apparatus of claim 10, further comprising at least one brush extending longitudinally along at least one of the arm portions toward the screen.

13. Apparatus of claim 12, wherein the brush is spaced from the air filter screen so as to be operable for carrying contaminants along the screen when the arm is rotated.

14. Apparatus of claim 12, wherein the air filter screen includes a generally radially extending knife on a surface thereof extending into a path of rotation of the brush so as to be cooperatively engageable therewith, for removing contaminants from the brush.

15. Apparatus of claim 14, wherein the knife includes serrations facing in a direction of rotation of the vacuum arm and the brush, for mechanically breaking up contaminants carried by the brush.

16. Apparatus of claim 10, wherein the center hub of the vacuum arm is connected to a vacuum source for creating a partial vacuum condition in the vacuum orifices.

17. Apparatus of claim 16, wherein the center hub of the vacuum arm is connected by a snap together rotary joint to a duct extending to the vacuum source, such that the joint can be unsnapped to allow removal of the vacuum arm from the duct.

18. Apparatus of claim 17, wherein the rotary joint is configured such that the center hub and the duct will be brought together to create a substantially sealed condition therebetween by the partial vacuum condition when present, and wherein the sealed condition will be broken when the partial vacuum condition is absent.

19. A rotary vacuum apparatus for removing contamination from an air filter screen, comprising:
    a vacuum arm having a center hub mounted for rotation in close proximity to the air filter screen, about a rotational axis extending through the screen, the vacuum arm including an elongate hollow first arm portion extending radially outwardly from the hub, and an elongate hollow second arm portion extending radially outwardly from the hub, wherein the first and second arm portions extend in opposite directions further wherein the first arm portion including an elongate first vacuum orifice which faces the air filter screen and has a first radial extent extending radially outwardly to a radial outer end thereof, the second arm portion including an elongate second vacuum orifice which faces the air filter screen and has a second radial extent extending from a radial inner end thereof to a radial outer end thereof, the radial outer end of the first vacuum orifice and the radial inner end of the second vacuum orifice being located at about an equal radial distance from the rotational axis, and the vacuum arm portions being substantially equal in mass so as to be substantially balanced about the rotational axis, and the center hub of the vacuum arm being connected by a snap together rotary joint to a duct extending to a vacuum source, wherein the rotary joint is configured such that the center hub and the duct will be brought together to create a substantially sealed condition therebetween by the partial vacuum condition when present, and wherein the sealed condition will be broken when the partial vacuum condition is absent to allow snapping the joint apart for removing the arm.

20. Apparatus of claim 19, further comprising an elongate plate supported for rotation about the rotational axis with the vacuum arm, in at least substantially parallel opposing relation thereto in proximity to an opposite surface of the air filter screen from the vacuum arm.

21. Apparatus of claim 19, further comprising at least one brush extending longitudinally along at least one of the arm portions toward the screen.

22. Apparatus of claim 21, wherein the brush is spaced from the air filter screen so as to be operable for carrying contaminants along the screen when the arm is rotated, without the brush contacting the screen.

23. Apparatus of claim 22, wherein the air filter screen includes a generally radially extending knife on a surface thereof extending into a path of rotation of the brush so as to be cooperatively engageable therewith, for removing contaminants from the brush.

24. Apparatus of claim 23, wherein the knife includes serrations or fingers facing in a direction of rotation of the vacuum arm and the brush, for mechanically breaking up contaminants carried by the brush.

25. Apparatus of claim 19, wherein the first and second arms are asymmetrical about the center hub.

26. A vacuum apparatus for removing contamination from an air filter screen, comprising:

a vacuum arm having a center hub mounted for rotation in close proximity to the air filter screen, about a rotational axis extending through the screen, the vacuum arm including an elongate hollow first arm portion extending radially outwardly from the hub, and an elongate hollow second arm portion extending radially outwardly from the hub, wherein the first and second arm portions extend in opposite directions, further wherein the first arm portion including an elongate first vacuum orifice which faces the air filter screen and has a first radial extent extending radially outwardly to a radial outer end thereof, the second arm portion including an elongate second vacuum orifice which faces the air filter screen and has a second radial extent extending from a radial inner end thereof to a radial outer end thereof, the radial outer end of the first vacuum orifice and the radial inner end of the second vacuum orifice being located at about an equal radial distance from the rotational axis, at least one of the arm portions including a brush extending longitudinally therealong disposed for passage along the screen during the rotation of the vacuum arm, and the air filter screen including a generally radially extending knife on a surface thereof extending into a path of rotation of the brush so as to be cooperatively engageable therewith, for removing contaminants from the brush.

27. Apparatus of claim 26, wherein the knife includes serrations or fingers facing in a direction of rotation of the vacuum arm and the brush, for mechanically breaking up contaminants carried by the brush.

28. Apparatus of claim 26, wherein the first and second arms are asymmetrical about the center hub.

* * * * *